US011982449B2

(12) United States Patent
Dempsey

(10) Patent No.: US 11,982,449 B2
(45) Date of Patent: May 14, 2024

(54) RADIANT HEATER AND METHOD OF MANUFACTURE

(71) Applicant: ECOVOLT LTD, Dublin (IE)

(72) Inventor: Stephen Dempsey, Dublin (IE)

(73) Assignee: ECOVOLT LTD (IE)

( * ) Notice: Subject to any disclaimer, the term of this patent is extended or adjusted under 35 U.S.C. 154(b) by 736 days.

(21) Appl. No.: 16/966,922

(22) PCT Filed: Feb. 5, 2019

(86) PCT No.: PCT/EP2019/052814
§ 371 (c)(1),
(2) Date: Aug. 3, 2020

(87) PCT Pub. No.: WO2019/149966
PCT Pub. Date: Aug. 8, 2019

(65) Prior Publication Data

US 2021/0048198 A1 Feb. 18, 2021

(30) Foreign Application Priority Data

Feb. 5, 2018 (IE) .................................. S2018/0020

(51) Int. Cl.

| | |
|---|---|
| ***H05B 3/03*** | (2006.01) |
| ***B05D 1/32*** | (2006.01) |
| ***F24D 13/02*** | (2006.01) |
| ***H05B 3/06*** | (2006.01) |
| ***H05B 3/20*** | (2006.01) |

(Continued)

(52) U.S. Cl.
CPC ............. *F24D 13/024* (2013.01); *B05D 1/32* (2013.01); *H05B 3/03* (2013.01); *H05B 3/06* (2013.01); *H05B 3/22* (2013.01); *H05B 3/267* (2013.01); *H05B 2203/013* (2013.01); *H05B 2203/017* (2013.01); *H05B 2203/032* (2013.01)

(58) Field of Classification Search
None
See application file for complete search history.

(56) References Cited

U.S. PATENT DOCUMENTS 3,999,040 A 12/1976 Ellis
2008/0056694 A1* 3/2008 Cooper ................. F24D 13/022 392/438

(Continued)

FOREIGN PATENT DOCUMENTS

DE 19538686 A1 * 4/1997 ........... C04B 14/024
EP 3106762 12/2016

(Continued)

OTHER PUBLICATIONS

DE19528686(A1), Apr. 1997, Brill et al., partial translation (Year: 1997).*

(Continued)

*Primary Examiner* — Joseph M. Pelham
(74) *Attorney, Agent, or Firm* — Whiteford, Taylor & Preston, LLP; Gregory M. Stone

(57) ABSTRACT

The present teachings relate to a method for producing a radiant heater comprising applying two electrodes to a substrate, and printing a desired area of the substrate with an electrically conducive paint to create a heating zone, wherein the desired area at least partially overlays the electrodes.

20 Claims, 12 Drawing Sheets

(51) Int. Cl.
*H05B 3/26* (2006.01)
*H05B 3/22* (2006.01)

(56) References Cited

U.S. PATENT DOCUMENTS

2010/0065542 A1* 3/2010 Dubey ..................... H05B 3/34 219/539
2010/0176118 A1* 7/2010 Lee .......................... H05B 3/34 219/549
2013/0140294 A1* 6/2013 Yeung .................. H05B 1/0202 219/541
2015/0053664 A1* 2/2015 Hu ......................... B64D 13/00 29/850
2015/0382403 A1* 12/2015 Philip ...................... H05B 3/12 219/541
2020/0116388 A1* 4/2020 Roach ...................... H05B 3/12
2020/0248059 A1* 8/2020 Miller ...................... C03C 17/04
2021/0396396 A1* 12/2021 Sajic ................... F24D 19/0276

FOREIGN PATENT DOCUMENTS

FR 2895205 A1 * 6/2007 ............. H05B 3/145
GB 2556066 A * 5/2018 ........... F24D 13/022
KR 20080000215 U * 2/2008
WO 2005/022954 3/2005
WO 2007/009232 1/2007
WO 2007/089118 8/2007
WO 2017/213495 12/2017

OTHER PUBLICATIONS

International Search Report issued in co-pending application No. PCT/EP2019/052814 on Apr. 30, 2019.

* cited by examiner

RADIANT HEATER AND METHOD OF MANUFACTURE

FIELD

The present application relates to a plasterboard radiant heater and method of manufacture of said plasterboard heater.

BACKGROUND OF THE INVENTION

Panel heater or direct acting heaters are slim-line and wall mounted heaters that provide direct heat quickly when the user needs it. Panel heaters usually have low thermal inertia allowing them to heat up rapidly in response to heating requirement. They also have an electronic or gas filled thermostat to avoid temperature drift. The range of controls allows the user to match their heating requirements with their schedule. This is achieved by using convection heat or a combination of radiation or convection, to heat up a space quickly. This means that the room is warm for the period of time selected and the temperature can be maintained for the duration of occupancy.

Infrared panel heaters provide a highly efficient form of electrical heat at a very low wattage, for example; a one kilowatt heater will provide enough energy to heat the average sized bedroom of 15 square meters. Additional savings can be made by installing a thermostat, so the heater will automatically turn off when the room reaches its desired temperature.

Electric resistance heating is 100% energy efficient in the sense that all the incoming electric energy is converted to heat in the form of infrared rays. Such panels can be wall or ceiling mounted, delivering heat and efficiency.

The aesthetics of such products are also important to customers. In general, panel heaters are slimline, smart and white, with digital control panels. However, all panel heaters are clearly visible within a room.

A known technique for providing less visible heating systems involves incorporating pipes within or behind plasterboard panels (also known as drywall, wallboard, gypsum panel, sheet rock, or gypsum board). Hot water can be pumped through these pipes to provide heat that is radiated through the drywall.

There is a need for an energy efficient radiant heater that is less visible in a room and more aesthetically pleasing. A heater that uses low power input to produce a radiant heater that can also benefit from energy generated from Solar P.V. A method of manufacturing such radiant heaters is also needed.

SUMMARY

The present teachings relate to a method for producing a radiant heater comprising applying two electrodes to a substrate, and printing a desired area of the substrate with an electrically conducive paint to create a heating zone, wherein the desired area at least partially overlays the electrodes.

The method may further comprise repeating the printing of the desired area with the electrically conductive paint such that a plurality of layers of the paint are applied to create the heating zone.

The method may further comprise applying a strip of conductive coating overlaying each electrode after printing of the desired area.

Optionally, each strip of conductive coating is wider than the electrode which it overlays.

Optionally, each strip of conductive coating is shorter than the electrode which it overlays.

Optionally, the strip of conductive coating is applied using screen printing.

The method may further comprise applying an electrode cover overlaying each of the electrodes prior to printing the desired area.

Optionally, the electrode cover is a strip of conductive paint.

Optionally, the electrode is a self adhesive conductive tape.

Optionally, printing the desired area comprises using a screen printer to print the electrically conducive paint.

The method may further comprise applying a primer to the substrate before applying the electrode The method may further comprise applying a sealer after printing of the desired area.

Optionally, the substrate is gypsum plasterboard.

The present teachings also related to a radiant heater comprising a substrate, two electrode applied to the substrate, a heating zone formed by an electrically conducive paint applied to a desired area of the substrate, wherein the desired area at least partially overlays the electrode.

Optionally, the heating zone is formed by a plurality of layers of electrically conductive paint.

The radiant heater may further comprise a strip of conductive coating on the heating zone and overlaying each electrode.

Optionally, each strip of conductive coating is wider than the electrode which it overlays.

Optionally, each strip of conductive coating is shorter than the electrode which it overlays.

The radiant heater may further comprise an electrode cover overlaying each of the electrodes, the electrode cover formed beneath the heating zone.

Optionally, the electrode cover is a strip of conductive paint.

Optionally, the electrode is a self adhesive conductive tape.

The radiant heater may further comprise a primer on the substrate.

The radiant heater may further comprise a sealer on the heating zone.

Optionally, the substrate is gypsum plasterboard.

BRIEF DESCRIPTION OF THE DRAWINGS

The present application will now be described with reference to the accompanying drawings in which.

DETAILED DESCRIPTION OF THE DRAWINGS

Figure 1:
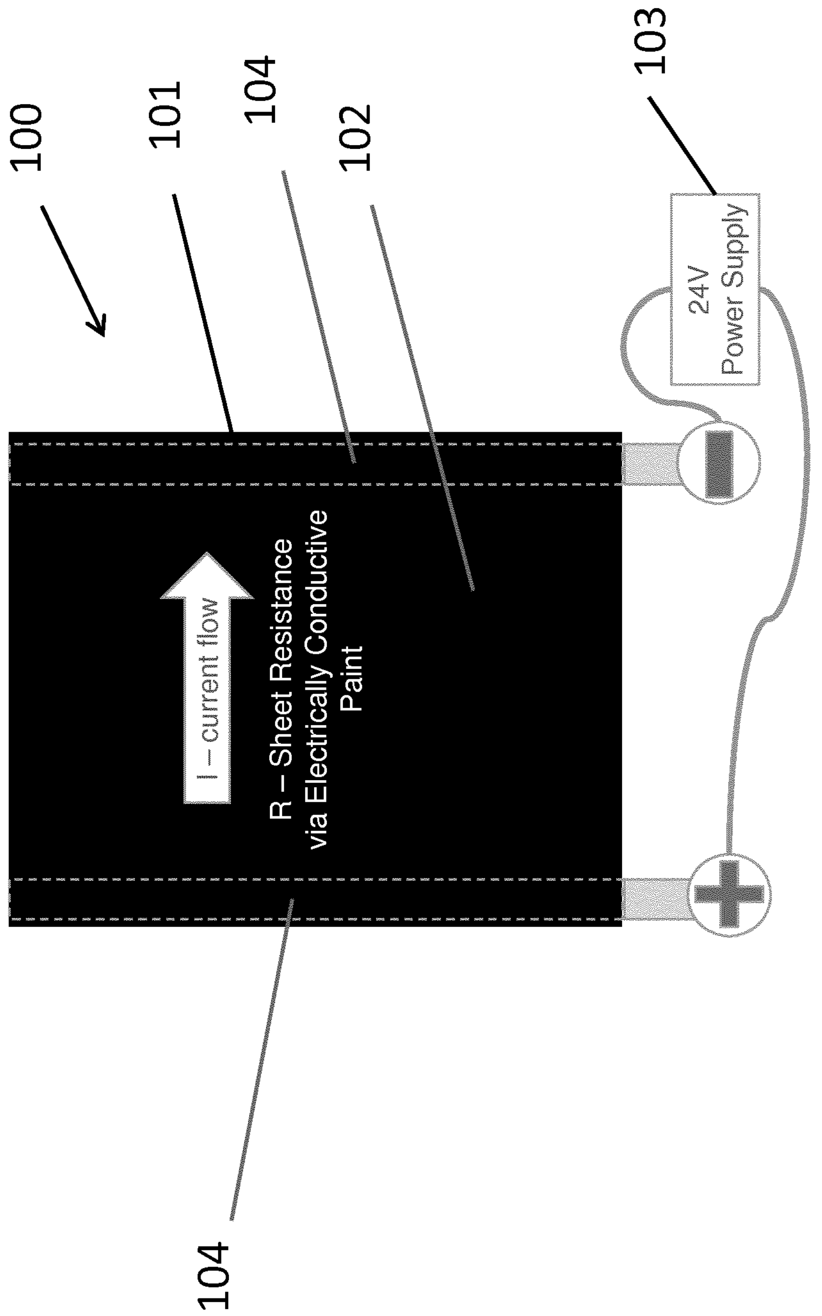
FIG. 1 shows a radiant hater according to the present teachings.

With reference to FIG. 1, the present teachings rely on an electrically conductive paint used for producing radiant heaters on plasterboard panels.

In particular, FIG. 1 shows an embodiment of a radiant heater 100 in accordance with the present teachings. A plasterboard panel 100, which has been coated in the electrically conductive paint 102. Power is supplied from a power supply 103 to electrodes 104. On application of voltage, current flows between the electrodes 104 via the conductive paint 102. This flow of current creates heat.

The physics are based on resistive heating principles/Ohms Law. The resulting heating produced is influenced by (i) the conductivity of an electrically conductive paint, (ii) the coating of the paint thickness, (iii) the electrical power applied and (iv) the electrode distance (v) the physical dimensions of the heating area The inventors of the present teachings have configured these factors in order to achieve a heating power of 350 W/m2 at 24V AC or DC. However, the skilled person will appreciate that this is merely exemplary, any heating power may be achieved.

Figure 2:
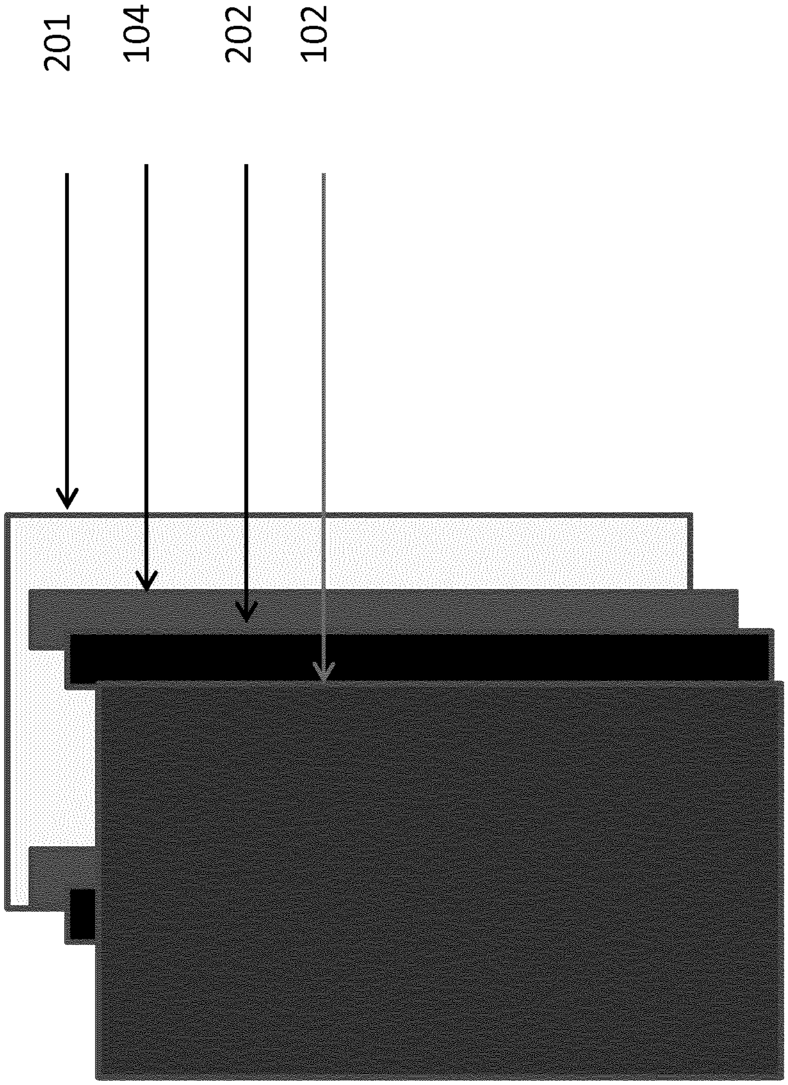
FIG. 2 is a layer model of the radiant heater according to the present teachings.

Turning to FIG. 2, this shows the layers that are applied in order to manufacture a radiant heater in accordance with an embodiment of the present teachings.

Firstly, in an optional step, a PVA primer 201 is applied to a substrate (not shown). The substrate may be plasterboard or any suitable material. This PVA primer effectively seals porous surfaces and prepares them for any architectural top coat. This can be used over bare or previously painted drywall, plaster, wood and masonry; it can be brushed, rolled or sprayed with ease.

Two electrodes 104 of any suitable material (e.g., copper) are then attached to the substrate. As previously mentioned with respect to FIG. 1, the purpose of the electrodes 104 is to apply voltage to the electrically conductive paint 102. It will be appreciated by the person skilled in the art that more than two electrodes can also be used with appropriate changes to the configuration.

Optionally, two coats of an electrode cover 202 may be applied over the aforementioned electrodes 104. A single coat 202 or more than two coats 202 can also be required dependent on the requirements of the radiant heater.

The electrode cover 202 is a narrow layer of conductive paint. This is applied so that subsequent application of conductive paint gets a good bond to the copper electrodes 104. This step can be removed to speed up the screen printing production process but it needs to be replaced with the layer of the silver/copper coating.

The electrically conductive paint 102 is then applied to a defined surface area as will be explained in more detail below.

A sealer 203 may then be applied over the defined surface area. The sealer is used to seal the electrically conductive paint so it does not transfer onto plaster or paint finishes and lose resistance. The sealer also acts as a barrier to relative humidity that also affects the final resistance of the radiant heater.

After installation, a layer of pre-plastering grit can be used before plastering so the plaster sticks to the sealer. This pre-plastering grit is commonly known as "Thistlebond" in the Irish and UK markets and is available off the shelf.

Figure 3:
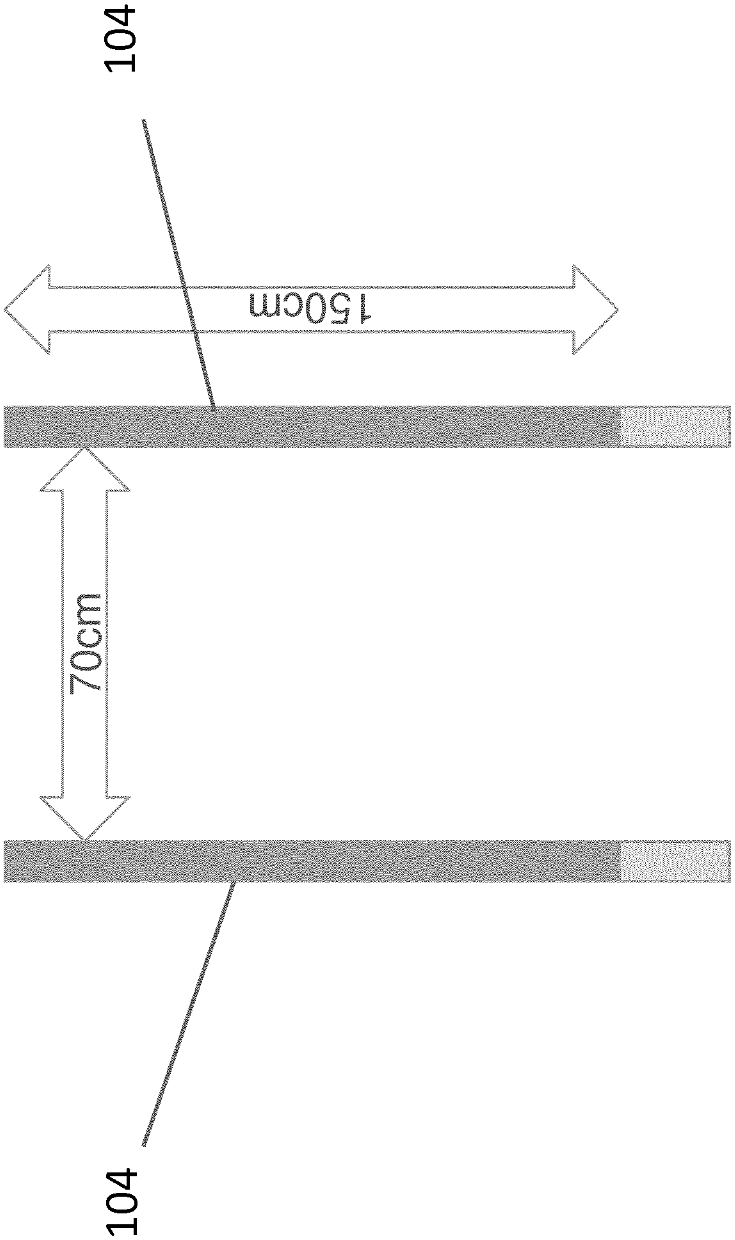
FIG. 3 provides an example of copper electrode placement on the radiant heater in accordance with the present teachings.

FIG. 3 provides more details of electrode 104 placement. For example, if the following configuration may be used for placement of electrodes 104 on a substrate. As previously mentioned, the substrate may be plasterboard.

| | |
|---|---|
| Dimension: | 150 × 70 cm |
| Heating Power: | 350 W/m2 |
| Electrical Power: | 24 V AC or DC |
| Secondary Current: | 14.5 A |
| Electrode: | Self adhesive Cu Tape, 40 mm |
| Surface temperature: | 50° C. |
| Application of Paint: | Paint roller, Spraying or screen printing |
| Carbon electric paint | Approx 300 grams |

Figure 4:
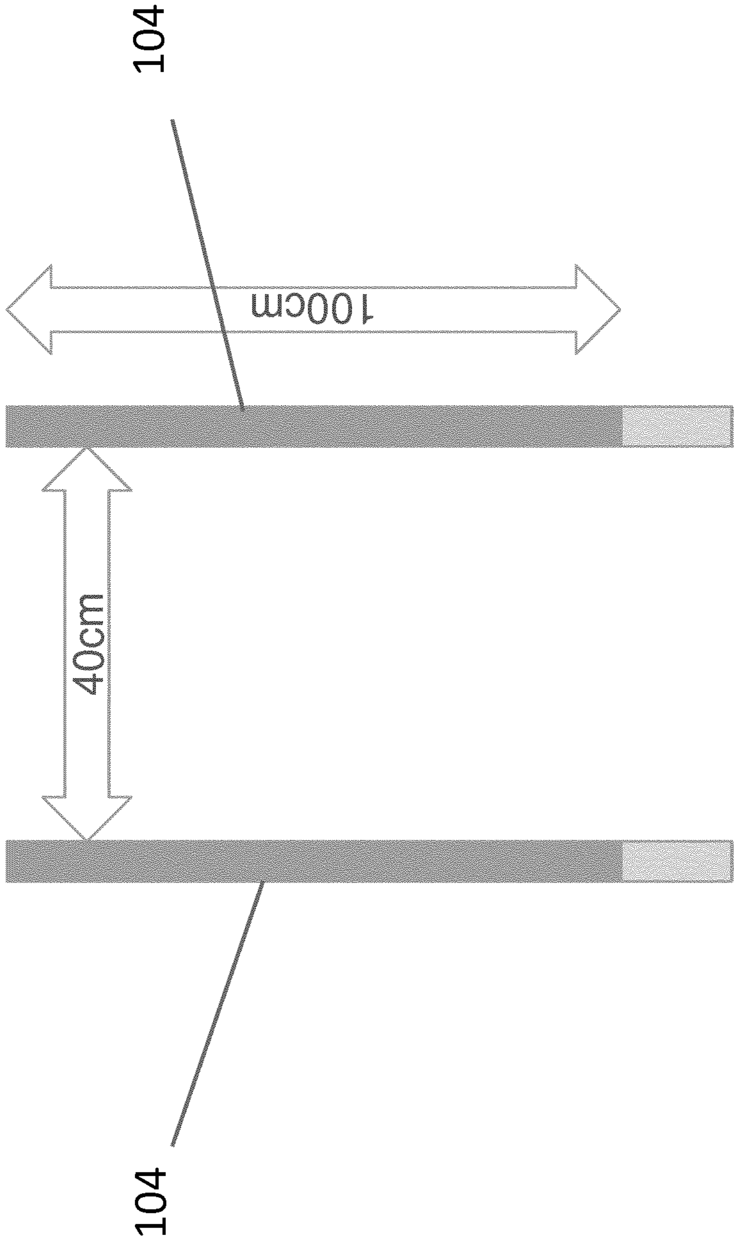
FIG. 4 provides another example of copper electrode placement on the radiant heater in accordance with the present teachings.

FIG. 4 provides an alternative configuration for the electrodes 104 to that shown in FIG. 3. The person skilled in the art will appreciate that these configurations are merely exemplary and the electrodes can be configures on the substrate in accordance with the requirements of the specific radiant heater.

| | |
|---|---|
| Dimension: | 100 × 40 cm |
| Heating Power: | 350 W/m2 |
| Electrical Power: | 24 V AC or DC |
| Secondary Current: | 7 A |
| Electrode: | Self adhesive Cu Tape, 40 mm |
| Surface temperature: | 50° C. |
| Application: | Paint roller, Spraying or screen printing |
| Carbon electric paint | Approx 60 grams |

Figure 5:
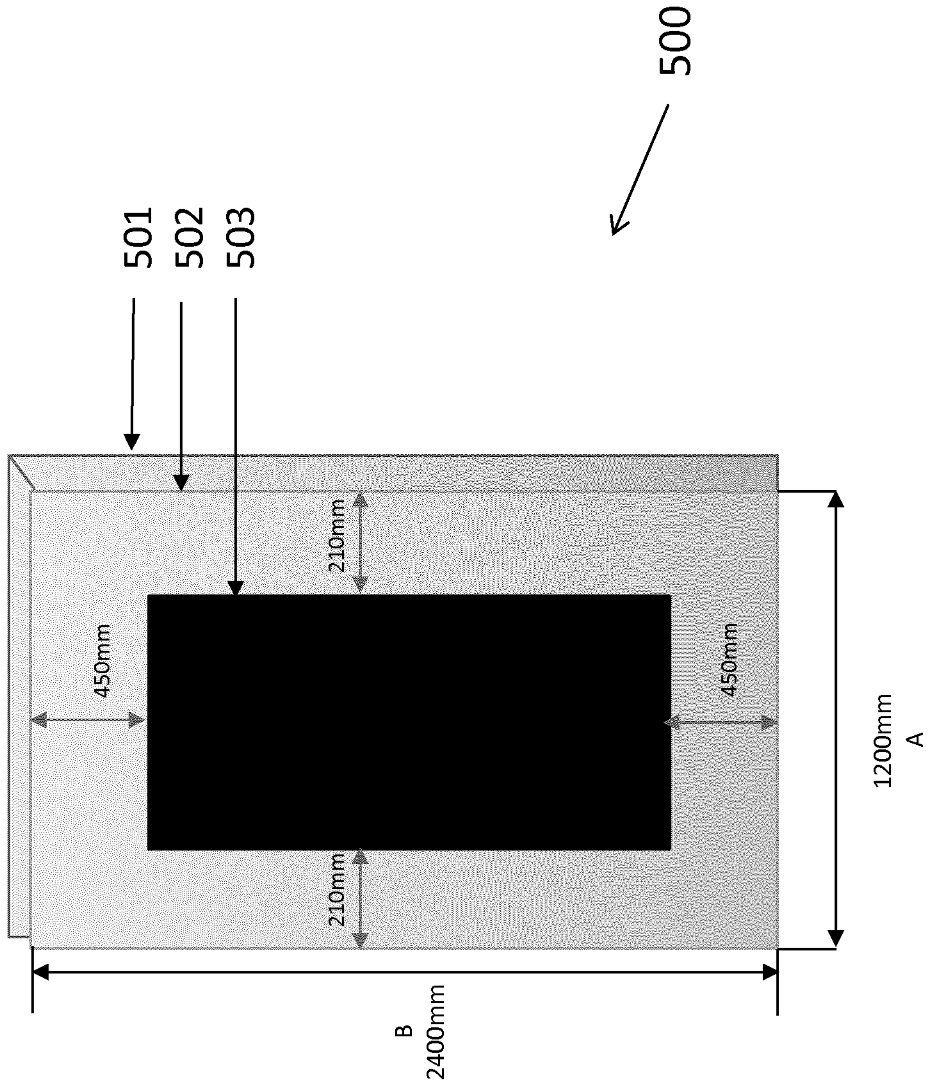
FIG. 5 is a view of a radiant heater in accordance with the present teachings.

FIG. 5 provides a view of a radiant heater (500) in accordance with the present teachings wherein the radiant heater is formed on a sheet of plasterboard having an insulation backing. Such plasterboard sheets are know in the art. For example, 50 mm rigid insulation 501 may be bonded to a 12.5 mm plasterboard sheet 502. The plasterboard may have a Width (A)—1200 mm and Length (B)—2400 mm.

A Heating Zone 503 having dimension of 150 cm×78 cm may created by the application of the aforementioned conductive paint. A Voltage of 24V may be applied to the conductive heating zone 503 with a current of 14.5 A. The heating zone 503 may have a resistance of 1.6Ω. The heating power generated by such a configuration is 350 Watts. Accordingly, a surface temperature up to 50° C. is created. Cable connections, 2.5 mm tri-rated 1.2 meter leads, may be used to provide the voltage to the heating panel.

Figure 6:
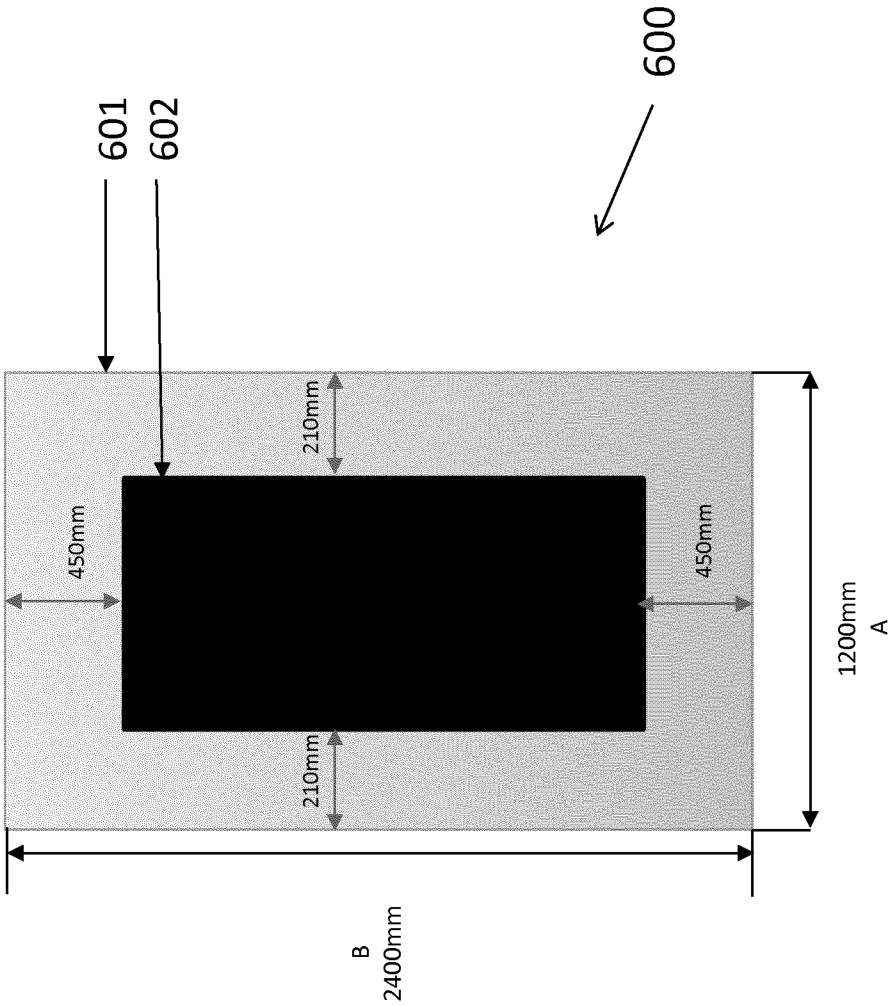
FIG. 6 is another view of a radiant heater in accordance with the present teachings.

FIG. 6 is an alternative configuration for a radiant heater (600) to that shown in FIG. 5 wherein the insulation backing is not provided:

12.5 mm Fire Rated plaster board (601)
Heating Zone (602) (150 cm×78 cm)
Width (A)—1200 mm
Length (B)—2400 mm
Voltage=24V
Current=14.5 A
Resistance=1.6Ω
Power=350 Watts Surface temperature up to 50° C.

Cable connection 2.5 mm tri-rated 1.2 meter leads

Figure 7:
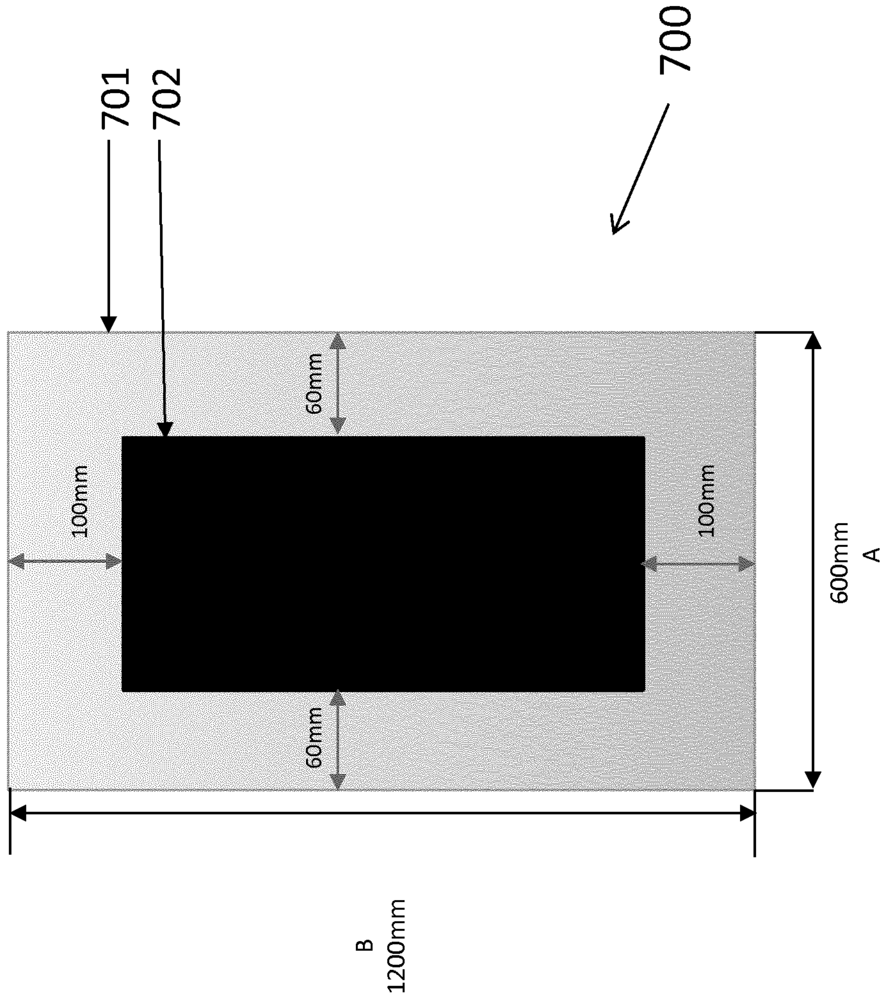
FIG. 7 is another view of a radiant heater in accordance with the present teachings.

FIG. 7 provides another alternative configuration for a radiant heater (700) to that shown in FIGS. 5 and 6:

12.5 mm Fire Rated plaster board (701)

Heating Zone (100 cm×48 cm) (702)

Width (A)—600 mm

Length (B)—1200 mm

Voltage=24V

Current=7 A

Resistance=3.2Ω

Power=175 Watts

Surface temperature up to 50° C.

Cable connection 2.5 mm tri-rated 1.2 meter leads

A number of alternative application techniques for the electrically conductive paint can be used in the method for producing a radiant heater in accordance with the present teachings.

Method for Formation|Electrically Conductive Paint|Application by Paint Roller

Stir electrically conductive paint

Apply (PVA) primer to heating Area

Apply electrodes and clean with alcohol

Pre-soak new roller sufficiently

Use exact amount (e.g., 320 ml) for standard boards 280 ml for insulated boards

Pre-coat electrodes with measured electrically conductive paint and dry with hot air gun Apply electrically conductive paint in 2 coats (dry between coats) 1.4-1.7 Ω

Dry and apply sealer

Apply power and allow to optimse (overnight)

Commission and certify

Painting beyond Electrode should be avoided=HOT SPOTS

Inhomogeneous Coating should be avoided=HOT SPOTS

Sheet resistance >2.0Ω TOO COLD

Sheet resistance <1.2Ω TOO HOT

It will be appreciated that the above application technique is merely exemplary and the present teachings should not be limited to these specifics.

Method for Formation|Electrically Conductive Paint|Application by Spraying

Stir Conductive Paint According to Instruction

Apply (PVA) primer to heating area

Apply electrodes and clean with alcohol

Obtain dead volume in spraygun

Use exact amount (320 ml) for standard boards 280 ml for insulated boards

Apply conductive paint in one layer. Avoid overspraying. (mask if neccessary)

Dry using hot air gun

Apply sealer and dry

Apply power and allow to optimise (overnight)

Commission and certify each zone

Again, it will be appreciated that the above application technique is merely exemplary and the present teachings should not be limited to these specifics.

Method for Formation|Electrically Conductive Paint|Application by Screen Printing Stir electrically conductive paint according to instruction Apply (PVA) primer to heating area Apply electrodes (150 cm×78 cm, merely exemplary) and clean with alcohol.

Place full plasterboard on automatic screen print machine

Use 16 T mesh screen to achieve desired target (an alternative mesh may be used)

Apply electrically conductive paint onto flood area of screen

Allow machine to flood and print cycle

Place printed board on drying rack to dry

Print silver/copper conductive coating overlapped electrodes and carbon electric paint (cep)

Place drying rack in room to dry (min 4 hours)

Complete electrode connection at rear of board with foil connector and 2.5 mm tri-rated cables (2 meter). It will be appreciated that when electricity is applied to the electrodes, it is transferred to the conductive paint and heat is generated by the resistance of the paint.

Test resistance, power and current and prepare shipping

It will be appreciated that the above application technique is merely exemplary and the present teachings should not be limited to these specifics. Some steps can be omitted. Furthermore, the specific dimensions, times and measurements can be adjusted as required by the person skilled in the art.

Figure 8A:
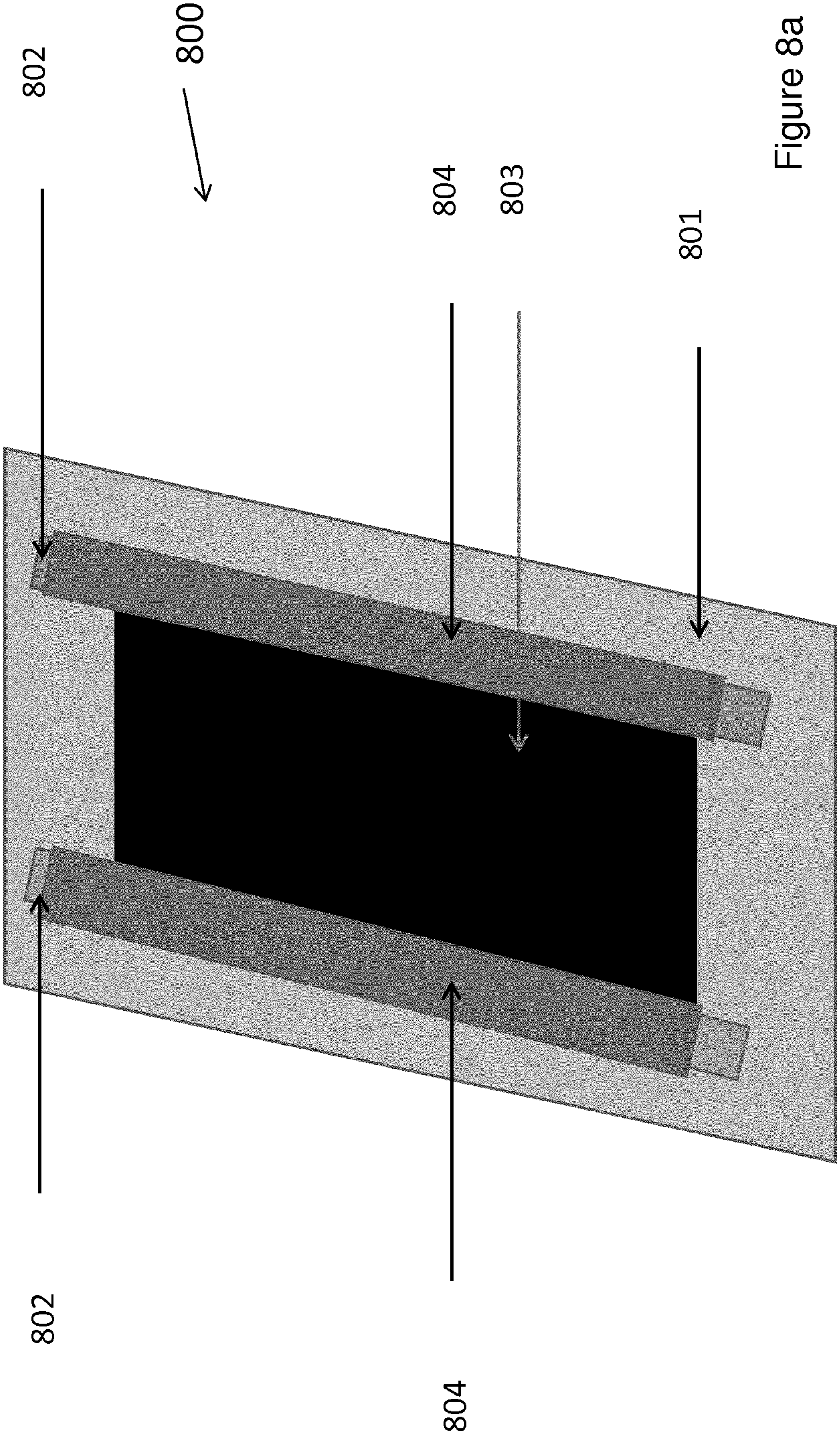
FIG. 8*a* is a layer model of the radiant heater according to the present teachings.
Figure 8B:
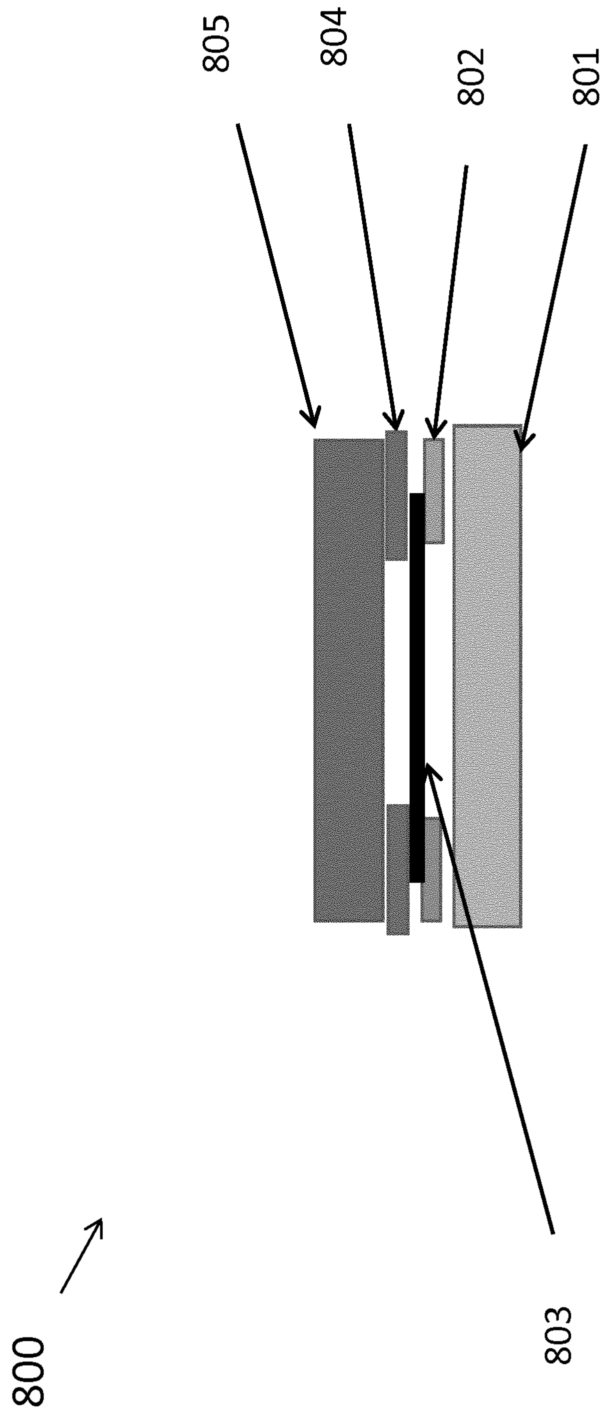
FIG. 8*b* is a different view of the layer model of FIG. 8*a* according to the present teachings.

FIGS. 8*a* and 8*b* show the layers that are applied in order to manufacture a radiant heater (800) in accordance with another embodiment of the present teachings.

A primer (not shown) may be applied to the substrate (801) as outlined with respect to FIG. 2.

Two electrodes (802) of any suitable material (e.g., copper) are then attached to the substrate (801). It will be appreciated by the person skilled in the art that more than two electrodes can also be used with appropriate changes to the configuration.

The electrically conductive paint 803 is then applied to a defined surface area as will be explained in more detail below. This can be done using screen printing as outlined in more detail below.

A highly conductive coating (804) is then applied to overlay the electrodes (802). This coating (804) can be applied by screen printed. It has been found that the conductive paint (803) is subject to expansion and contraction due to temperature and humidity conditions. This can produce unwanted effects such as arcing/sparking.

To reduce the effects of arcing/sparking between the electrodes (802) a highly conductive coating (804) can be used. This coating is applied by screen printing over the area where the copper electrodes and carbon electric paint make contact with each other. The highly conductive coating (804) should be wider than the electrodes (802) so it overlaps each side of the corresponding electrode as shown in FIGS. 8*a* and 8*b*. It has been found that electrodes (802) of 40 mm by 1700 mm overlaid by coating (804) of 1500 mm by 50 mm works well. However, the subject teachings should not be interpreted as limited to this example. The electrode length of 1700 mm in length has a 200 mm capacity to allow for the termination of the foil connector These strips of conductive coating (804) will reduce the arcing/sparking that can occur from the stretching/shrinking effect between the different coefficients of the materials used. It is possible to use any highly conductive materials (copper, silver, gold etc.) for this purpose and it is also possible to apply the layer without screen printing. A copper foil tape can be used and applied by hand or machine to produce the same result.

A sealer (805) shown in FIG. 8*b* may be applied as outlined above with respect to FIG. 2.

Figure 9A:
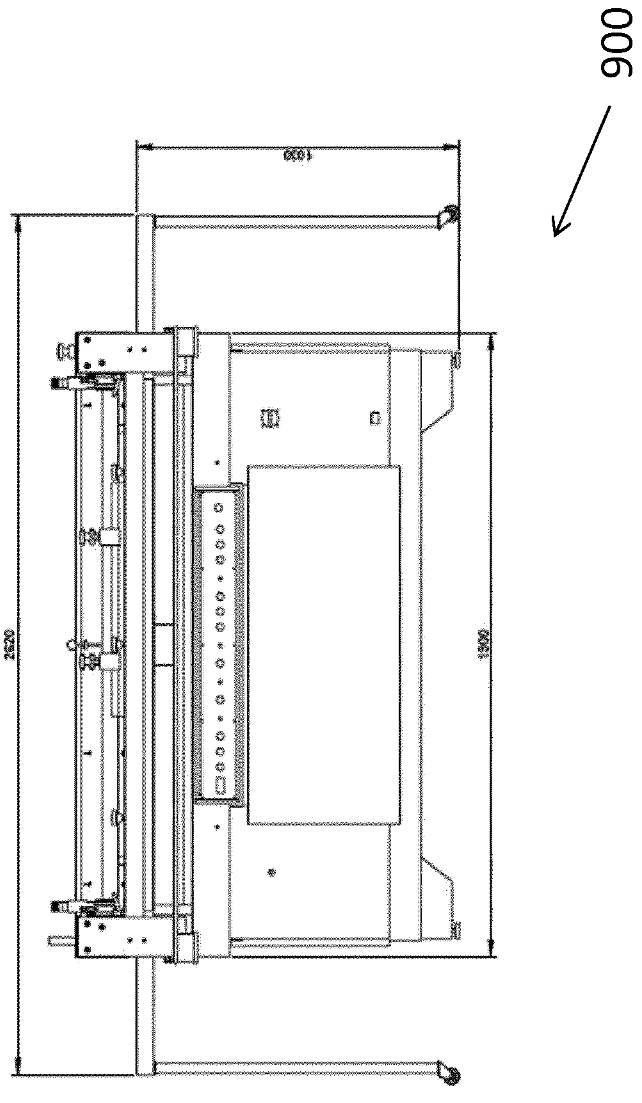
FIG. 9*a* is a first view of a screen printer used to apply electrically conductive paint to create a radiant heater in accordance with the present teachings.
Figure 9B:
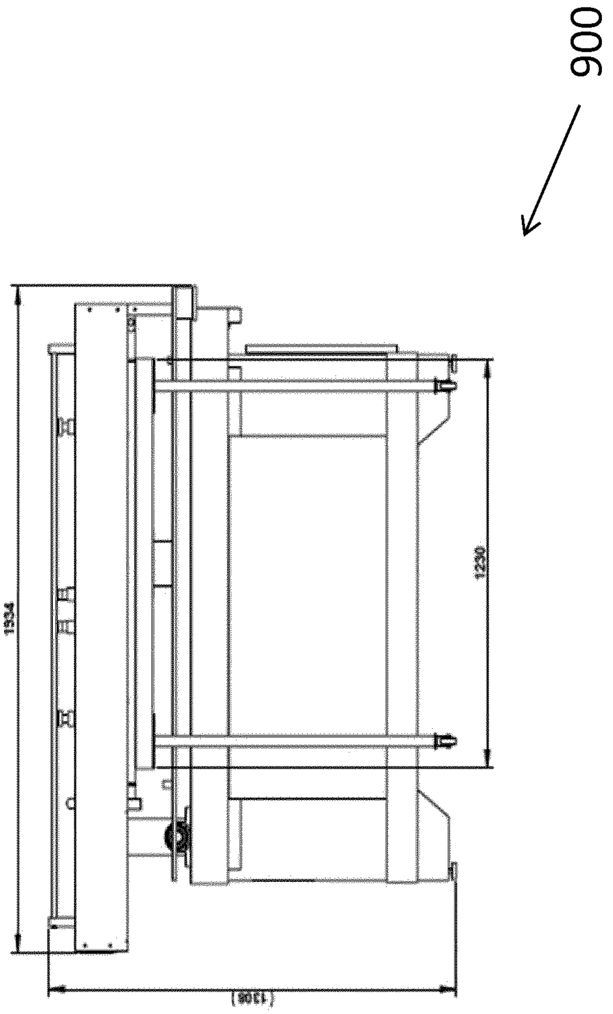
FIG. 9*b* is another view of a screen printer used to apply electrically conductive paint to create a radiant heater in accordance with the present teachings.

FIGS. 9*a* and 9*b* show view of an exemplary screen printer (900) that can be used in the aforementioned method of forming a radiant heater.

As in known in the art, screen printing includes using a piece of mesh stretched over a frame. The mesh could be made of a synthetic polymer, such as nylon, and a finer and smaller aperture for the mesh would be utilized for a design that requires a higher and more delicate degree of detail. For the mesh to be effective it must be mounted on a frame and it must be under tension.

A stencil is formed by blocking off parts of the screen in the negative image of the design to be printed; that is, the open spaces are where the ink will appear on the substrate.

Before printing occurs, the frame and screen must undergo the pre-press process, in which an emulsion is 'scooped' across the mesh and the 'exposure unit' burns away the unnecessary emulsion leaving behind a clean area in the mesh with the identical shape as the desired image. The surface to be printed (commonly referred to as a pallet) is coated with a wide 'pallet tape'. This serves to protect the 'pallet' from any unwanted ink leaking through the screen and potentially staining the 'pallet' or transferring unwanted ink onto the next substrate. Next, the screen and frame are lined with a tape. The type of tape used in for this purpose often depends upon the ink that is to be printed onto the substrate. These aggressive tapes are generally used for UV and water-based inks due to the inks' lower viscosities. The last process in the 'pre-press' is blocking out any unwanted 'pin-holes' in the emulsion. If these holes are left in the emulsion, the ink will continue through and leave unwanted marks. To block out these holes, materials such as tapes, speciality emulsions and 'block-out pens' may be used effectively.

The screen is placed atop a substrate. Ink is placed on top of the screen, and a floodbar is used to push the ink through the holes in the mesh. The operator begins with the fill bar at the rear of the screen and behind a reservoir of ink. The operator lifts the screen to prevent contact with the substrate and then using a slight amount of downward force pulls the fill bar to the front of the screen. This effectively fills the mesh openings with ink and moves the ink reservoir to the front of the screen. The operator then uses a squeegee (rubber blade) to move the mesh down to the substrate and pushes the squeegee to the rear of the screen. The ink that is in the mesh opening is pumped or squeezed by capillary action to the substrate in a controlled and prescribed amount, i.e. the wet ink deposit is proportional to the thickness of the mesh and or stencil. As the squeegee moves toward the rear of the screen the tension of the mesh pulls the mesh up away from the substrate (called snap-off) leaving the ink upon the substrate surface.

There are three common types of screen printing presses. The 'flat-bed', 'cylinder', 'rotary'. The present teachings rely on a flat bed screen printer. The use of a screen printer is particularly advantageous as it results in an even application of the conductive paint within the desired area (heating zone). That is, uneven or inhomogeneous coating is avoided. Accordingly, hot spots on the radiant heater are avoided. It will be appreciated that if the conductive paint is applied unevenly, the thicker areas of conductive paint will be more electrically conductive and will produce more heat (perhaps too much heat) when electricity is applied. The use of a screen printer addresses these issues. However, alternative printing method may be used as outlined below>

Dot Matrix, or Impact printing, using a cloth, sponge, or other porous substance, soaked in carbon graphite or similar paint, and struck or pressed by rods or rollers to deposit the coating (conductive paint) onto a panel, board, or sheet, in order to produce a usable heating element.

Roller, using automated rollers to deposit an even thickness and consistency of carbon graphite or similar paint to the surface of a panel, board, or sheet, in order to produce a usable heating element.

Powder Coating, using electrically charged particles of carbon graphite or similar paint sprayed to a negatively charged panel, board, or sheet, in order to produce a usable heating element.

Inkjet printing, using ionized particles of carbon graphite or similar paint, directed by magnetic plates, sprayed onto a panel, board, or sheet, in order to produce a usable heating element.

Spray painting, using an automated sprayhead or heads, to spray carbon graphite or similar paint onto a panel, board, or sheet, in order to produce a usable heating element.

Sublimation printing, using a heat transfer printer to adhere carbon graphite or similar paint onto a panel, board, or sheet, in order to produce a usable heating element.

Installation|Plaster Filler on Electrodes

Use plaster filler to conceal electrodes on a plasterboard

Only used if conductive paint is not plastered over

Spread plaster using filler knife

Allow to dry, sand smooth ready for painting—any regular paint can be used with the radiant heater in acccordance with the present teachings. Thermochromic paint can be used to display that the area that is heated will be visible to the user A plaster finish may be applied to the completed radiant heater Use approved plaster Install a layer of plastering grit over the sealer of the carbon heater before applying plaster.

Ensure standard plaster is sufficient before use. Gypsum skimcoat or similar approved Allow to dry out completely before applying power Wall paint can be applied to the completed radiant heater Use approved wall paint.

Ensure standard wall paint is sufficent before use

Use water-base wall paint only

Figure 10:
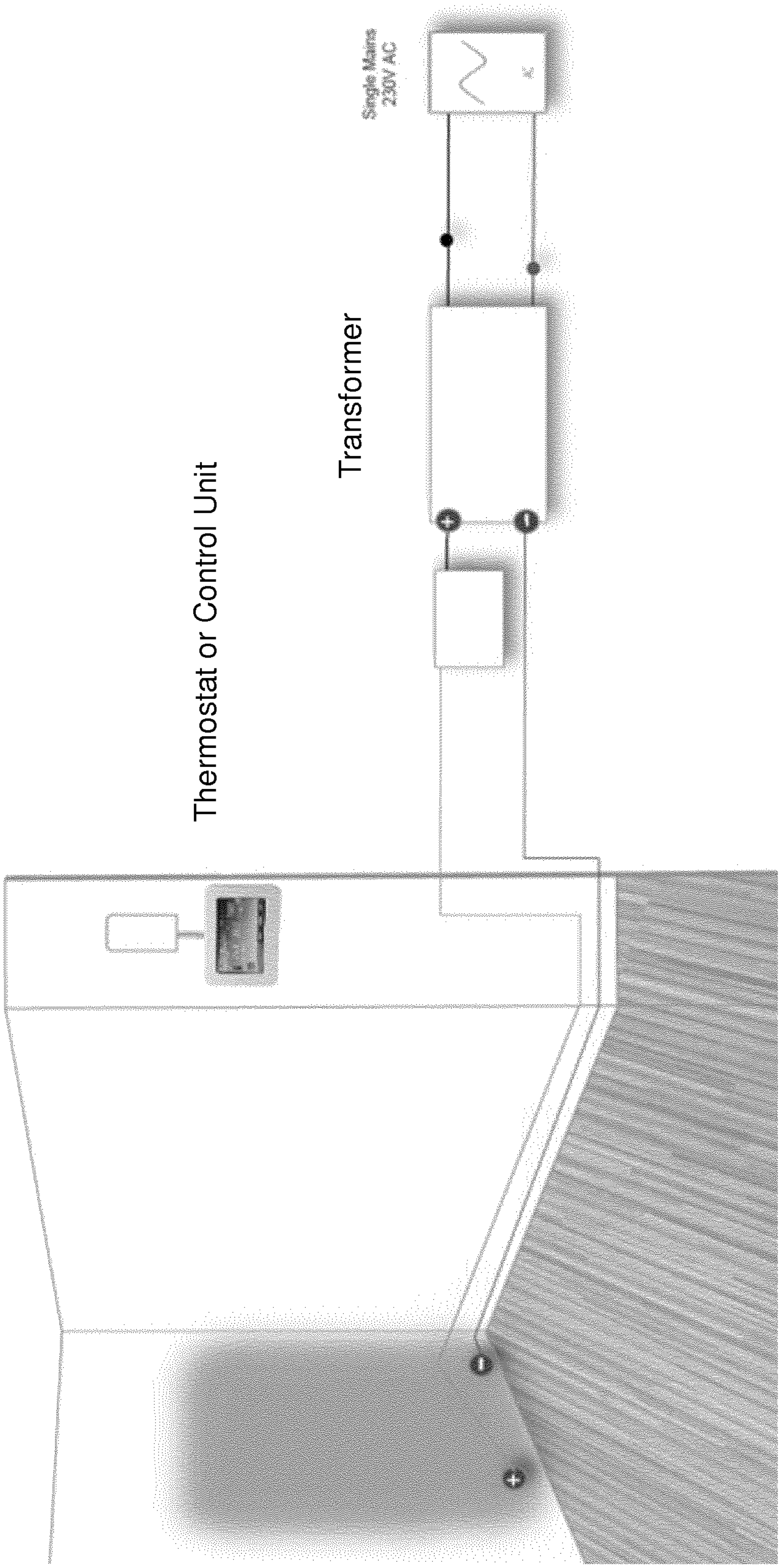
FIG. 10 is view of a radiant heater in operation in accordance with the present teachings.

A transformer needs to be installed after the radiant heater is installed in a premises. Such a transformer and exemplary configuration is shown in FIG. 10.

Installed by qualified/certified technician

Verify distance from transformer to Zone (check volt drop calc)

Cable not damaged/uninsulated

Segregated from L.V cabling

Check cable size is adequate as per volt drop tables

Locate transformer closer to zones if possible

Locate transformer in a well ventilated space

Avoid long cable runs

The present teachings provided a means for accelerated project installations, industry standard plasterboards are printed with the electrically conductive paint embedded onto the surface. The plasterboard is then cured, sealed and ready for shipping. The boards also come with fixing points for industry standard at 40 cm centres. Once installed the board is ready for gypsum skim coat plaster finish, allowed to dry before the 24V power is applied.

The electrically conductive paint is preferably applied using a printer to the plasterboard. When completed, both methods are very effective with the end results providing a very efficient heating system The system when installed can be completely painted over using any water based decorative paint making it invisible to the naked eye. No requirement for any boilers, radiators, pipes, water, tanks, gas or oil. The wall or ceiling becomes the radiator which will free up valuable space in your property.

Benefit from energy savings compared to traditional heating systems. Only 350 watts/m2 consumed per heating zone. Powered by 24V AC toroidal transformers or 24 VDC switched power supplies, each transformer is specially optimised and wound to reduce losses. Electrically conductive paint with low consumption rate with high heat output can be integrated with Solar PV systems to further assist with energy savings The system also enjoys having the award winning integrated in every Heating Control Unit (HCU). This facility allows for multiple-zone control without the requirement for any complex wiring. Utilising radio frequency control with superior signal strengths the JS10/2 can send commands to the HCU from distances of up to meters through floors, walls and ceilings.

Thermochromic paint can be used on the radiant heater of the present teachings to display the area that is heated as visible to the user.

The invention claimed is:

1. A method for producing a radiant heater comprising:

applying two electrodes to a substrate;

printing a desired area of the substrate with an electrically conductive paint to create a heating zone, wherein the desired area at least partially overlays the electrodes; and applying a strip of electrically conductive coating overlaying each electrode after printing of the desired area such that each strip of the electrically conductive coating is wider than the electrode which it overlays, overlaps each side of the electrode which it overlays, and at least partially overlays the desired area.

2. The method of claim 1 further comprising repeating the printing of the desired area with the electrically conductive paint such that a plurality of layers of the paint are applied to create the heating zone.

3. The method of claim 1 wherein each strip of electrically conductive coating is shorter than the electrode which it overlays.

4. The method of claim 1 wherein the strip of electrically conductive coating is applied using screen printing.

5. The method of claim 1 further comprising applying an electrode cover overlaying each of the electrodes prior to printing the desired area.

6. The method of claim 3 wherein the electrode cover is a strip of electrically conductive paint.

7. The method of claim 1 wherein the electrode is a self adhesive electrically conductive tape.

8. The method of claim 1 wherein printing the desired area comprises using a screen printer to print the electrically conductive paint.

9. The method of claim 1 further comprising applying a primer to the substrate before applying the electrode.

10. The method of claim 1 further comprising applying a sealer after printing of the desired area.

11. The method of claim 1 wherein the substrate is gypsum plasterboard.

12. A radiant heater comprising:

a substrate;

two electrodes applied to the substrate;

a heating zone formed by an electrically conductive paint applied to a desired area of the substrate, wherein the desired area at least partially overlays the electrodes; and a strip of electrically conductive coating overlaying each electrode wherein each strip of the electrically conductive coating is wider than the electrode which it overlays, overlaps each side of the electrode which it overlays, and at least partially overlays the desired area.

13. The radiant heater of claim 12 wherein the heating zone is formed by a plurality of layers of electrically conductive paint.

14. The radiant heater of claim 12 wherein each strip of electrically conductive coating is shorter than the electrode which it overlays.

15. The radiant heater of claim 12 further comprising an electrode cover overlaying each of the electrodes, the electrode cover formed beneath the heating zone.

16. The radiant heater of claim 15 wherein the electrode cover is a strip of electrically conductive paint.

17. The radiant heater of claim 12 wherein the electrode is a self adhesive electrically conductive tape.

18. The radiant heater of claim 12 further comprising a primer on the substrate.

19. The radiant heater of claim 12 further comprising a sealer on the heating zone.

20. The radiant heater of claim 12 wherein the substrate is gypsum plasterboard.

* * * * *